O. OLSON.
MOVABLE SUPPORT FOR THRESHING MACHINE CONCAVES.
APPLICATION FILED APR. 23, 1908.
906,553.
Patented Dec. 15, 1908.
3 SHEETS—SHEET 1.
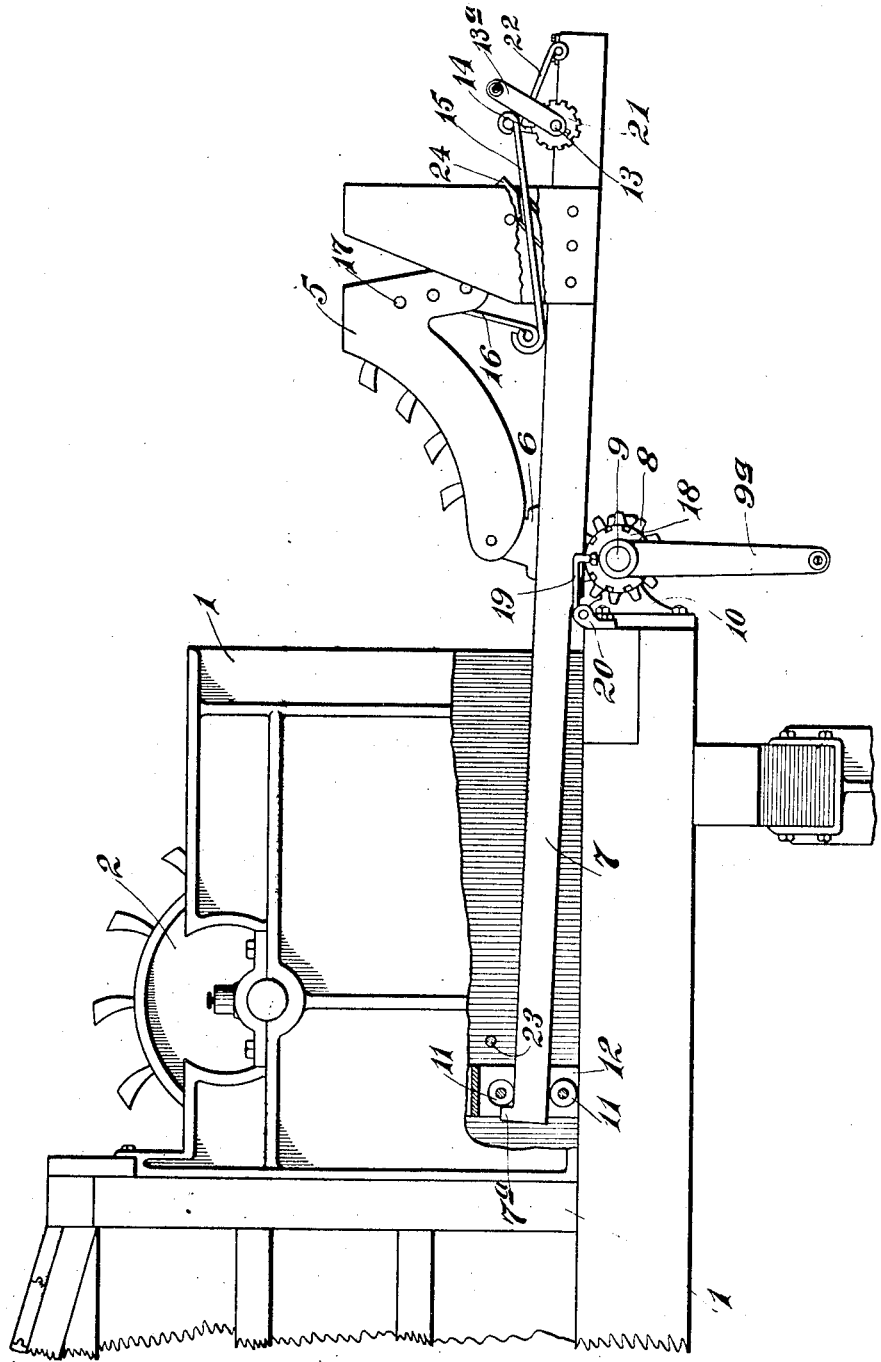

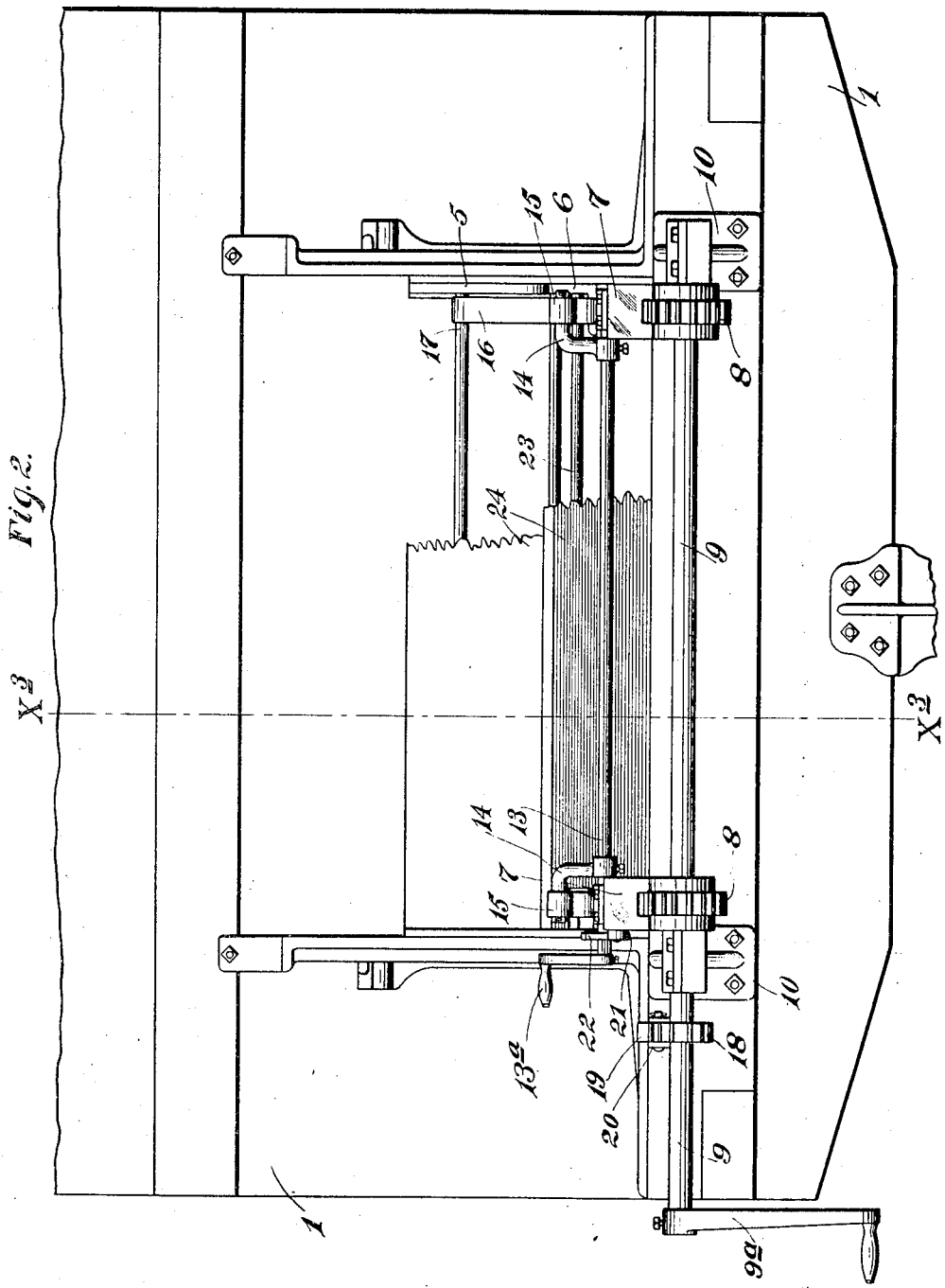

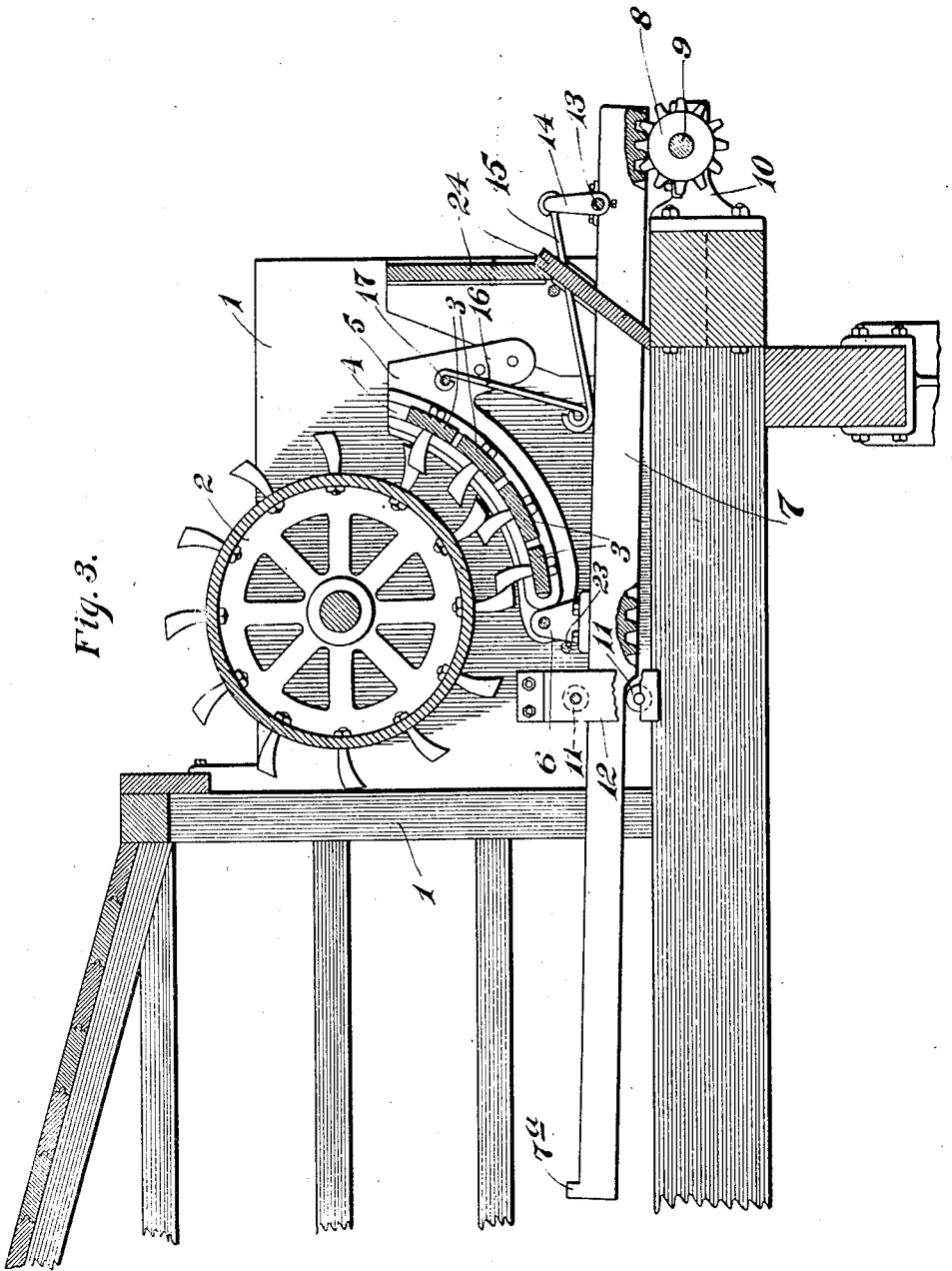

UNITED STATES PATENT OFFICE.

OLAUS OLSON, OF CLARISSA, MINNESOTA.

MOVABLE SUPPORT FOR THRESHING-MACHINE CONCAVES.

No. 906,553.   Specification of Letters Patent.   Patented Dec. 15, 1908.

Application filed April 23, 1908. Serial No. 428,745.

*To all whom it may concern:*

Be it known that I, OLAUS OLSON, a citizen of the United States, residing at Clarissa, in the county of Todd and State of Minnesota, have invented certain new and useful Improvements in Movable Supports for Threshing-Machine Concaves; and I do hereby declare the following to be a full, clear, and exact description of the invention, such as will enable others skilled in the art to which it appertains to make and use the same.

My invention relates to threshing machines and has for its object to provide a simple and efficient device for supporting the concave movably in respect to the threshing cylinder and in such manner that the concave may be readily moved into an inoperative position where ready access may be had thereto for the purpose of repair or adjustments of the parts.

To the above ends the invention consists of the novel devices and combinations of devices hereinafter described and defined in the claims.

The invention is illustrated in the accompanying drawings, wherein like characters indicate like parts throughout the several views.

Referring to the drawings, Figure 1 is a view in side elevation with some parts broken away, illustrating my invention applied to an ordinary threshing machine and showing the concave moved into an inoperative position outside of the case of the machine. Fig. 2 is an elevation, with parts broken away, looking at the receiving end of the threshing machine and showing my invention applied thereto; and Fig. 3 is a vertical longitudinal section taken on the line $x^3$ $x^3$ of Fig. 2, showing the concave supported in an operative position.

Of the parts of the threshing machine, the numeral 1 indicates, as an entirety, the case of the threshing machine and the numeral 2 indicates the toothed threshing cylinder, which parts may be of the usual construction. The toothed concave which coöperates with the said toothed cylinder is shown of substantially the standard construction, being made up of a multiplicity of toothed bars 3 that are detachably seated in a segmental groove 4 of a pair of curved end brackets 5. In carrying out my invention, the lower ends of these end brackets 5 are preferably pivoted to bearings 6 that are bolted or otherwise rigidly secured each to one of a pair of long parallel rack bars 7.

The rack bars 7, at their under edges, are provided with intermediately located teeth that engage spur pinions 8 rigidly secured to a counter-shaft 9 mounted in suitable bearings 10 on the frame-work of the casing 1. The pinions 8 have projecting hub portions and the rack bars 7 have depending side flanges that embrace said pinions and engage their said hubs, as best shown in Fig. 2, thereby holding the said rack bars against lateral movement in respect to said pinions. The teeth of the rack bars 7 extend approximately from their outer to their central portions, and their reduced inner portions are arranged to run between pairs of anti-friction guide rollers 11 mounted in bearing brackets 12 suitably secured to the machine case 1. At the extreme inner ends of the bars 7 are stop lugs 7ª that prevent the said bars from being moved outward entirely from between the coöperating rollers 11, as best shown in Fig. 1. The counter-shaft 9 is provided, at one end, with an operating crank 9ª, by means of which it may be rotated to impart endwise traveling movements to the rack bars 7 and, hence, to the concave carried thereby.

As a secondary feature of this invention, the concave is adjustably supported on the rack bars or movable support therefor, so that said concave may be set in different operative positions in respect to the cylinder. For this purpose a rock shaft 13 is mounted in suitable bearings on the outer end portions of the rack bars 7 and is provided, just inward of the ends of the said rack bars, with crank arms 14, and just outward of one of said rack bars with an operating crank 13ª. The crank arms 14 are connected to the outer ends of flat links 15, the inner ends of which slide freely on the upper surfaces of the respective rack bars 7. Links 16 are pivotally connected at their lower ends to the sliding inner ends of the links 15 and, at their upper ends, they are pivotally connected, at 17, to the free end portions of the concave end brackets 5.

As is evident, the free or outer end portion of the concave will be moved to its highest position when the links 16 are moved into vertical positions, and, conversely, the said concave will be lowered by moving the said links 16 away from vertical positions. This adjustment adapts the concave to be set for various kinds of work and different kinds and quantities of grain.

To lock the rack bars 7 against endwise movements, the shaft 9 is provided with a notched wheel 18 that is adapted to be engaged by a lock dog 19, shown as pivoted to a small bracket 20 on the frame of the machine case. Likewise, to lock the rock shaft 14 against movement, it is provided with a notched wheel 21 that is adapted to be engaged by a lock dog 22, pivotally connected to the outer end portion of one of the rack bars 7, as best shown in Fig. 1.

A transverse rod 23, which is passed through the sides of the machine case, is engageable with the bearings 6 on the rack bars 7 and serves as a stop to limit the extreme inward movement of the concave. Outward of and below the concave the rack bars 7 carry guard boards 24 that serve to prevent an outward splattering of the threshed grain. The said boards 24 are provided with suitable clearance passages for the links 15.

As is evident, the mechanism above described affords extremely simple and efficient means whereby the toothed concave may be quickly moved to and from its operative position. When the said concave is moved into the inoperative position shown in Fig. 1, it is entirely outside of the machine case and, hence, is in a position where easy access can be had thereto for the purpose of repair, adjustment, or any other purpose. Furthermore, when the toothed concave is in operative position, it is firmly supported so that it will do as good work as if permanently secured in position. The device may be readily applied to standard threshing machines.

What I claim is:

1. In a threshing machine, the combination with a toothed cylinder and concave, of a slidable concave support to which said toothed concave is adjustably connected and which support is capable of sufficient movement to carry the entire concave and adjusting connections entirely outside of the machine frame, substantially as described.

2. In a threshing machine, the combination with a toothed cylinder and concave, of a pair of rack bars, a shaft having pinions engaging said rack bars, and means adjustably supporting said concave from said rack bars, comprising a rock shaft with crank arms, links connected to said crank arms with their free ends arranged to slide on said rack bars, and links connecting the free ends of said first noted links to the free outer end portion of said concave, substantially as described.

3. In a threshing machine, the combination with a toothed cylinder and concave, of a pair of toothed rack bars to which said concave is pivotally connected at its lower inner end portion, a counter-shaft provided with an operating crank and having pinions meshing with said rack bars, means for locking said counter-shaft against rotation, a rock shaft mounted on said rack bars and provided with an operating crank and with crank arms, means for locking said rock shaft against oscillation, links connected to said crank arms with their free ends arranged to slide upon said rack bars, and links connecting the free ends of the first noted links to the upper outer end portion of said concave, substantially as described.

In testimony whereof I affix my signature in presence of two witnesses.

OLAUS OLSON.

Witnesses:
L. D. THAYER,
L. O. RAMSTAD.